No. 612,590. Patented Oct. 18, 1898.
A. E. MACDONALD.
DENTAL ENGINE.
(Application filed Jan. 25, 1898.)
(No Model.)
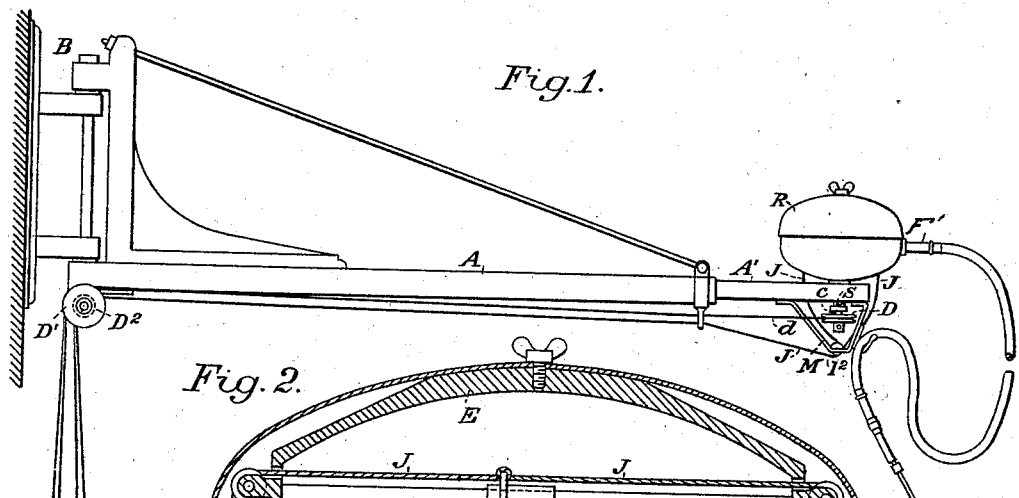
Fig. 1.
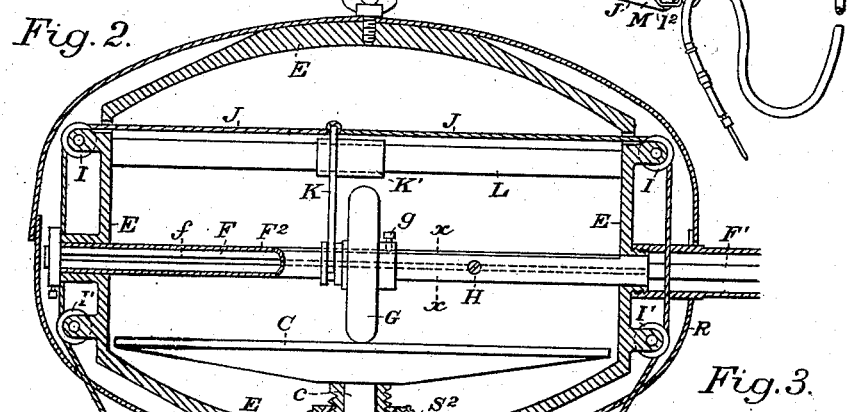
Fig. 2.
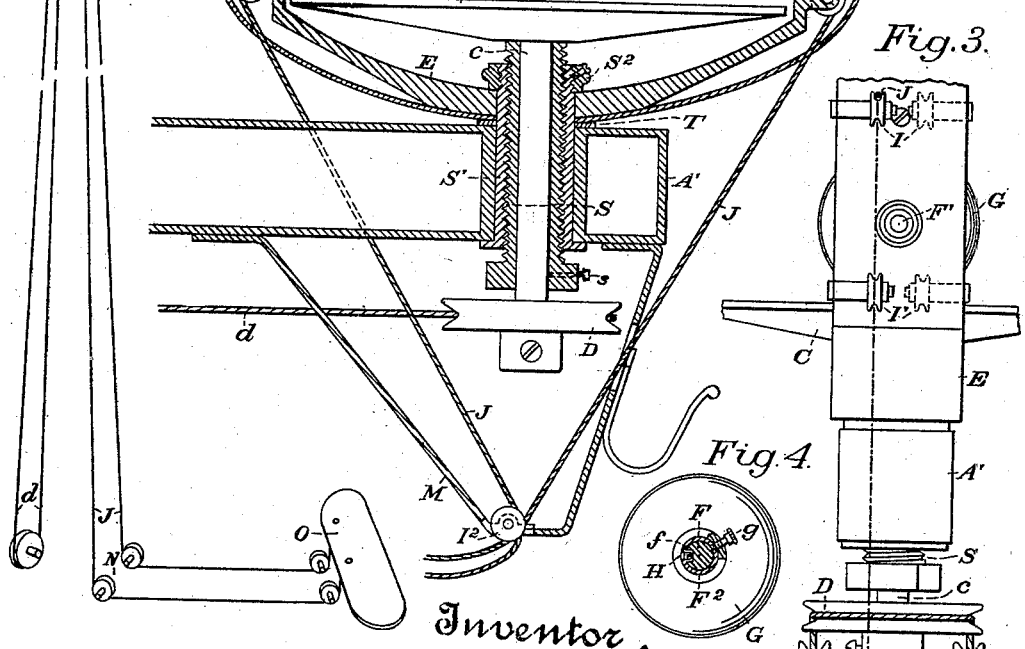
Fig. 3.
Fig. 4.
Fig. 5.
Witnesses,
Inventor,
Albert E. Macdonald
By Dewey Strong & Co.
Atty
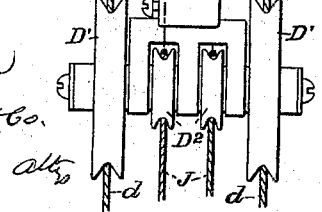
THE NORRIS PETERS CO., PHOTO-LITHO., WASHINGTON, D. C.

UNITED STATES PATENT OFFICE.

ALBERT E. MACDONALD, OF SAN FRANCISCO, CALIFORNIA.

DENTAL ENGINE.

SPECIFICATION forming part of Letters Patent No. 612,590, dated October 18, 1898.

Application filed January 25, 1898. Serial No. 667,855. (No model.)

*To all whom it may concern:*

Be it known that I, ALBERT E. MACDONALD, a citizen of Canada, residing in the city and county of San Francisco, State of California, have invented an Improvement in Dental Engines; and I hereby declare the following to be a full, clear, and exact description of the same.

My invention relates to improvements in dental engines.

It consists of the parts and the constructions and combinations of parts hereinafter described and claimed.

Figure 1 is a side elevation of my invention. Fig. 2 is a vertical section embodying the principal feature of the same. Fig. 3 is an end elevation. Fig. 4 is a transverse section on the line $x\ x$ of Fig. 2. Fig. 5 is a detail view of the treadle.

A is the bracket-arm, of any usual or suitable construction, hinged to the wall or other support at B, so as to be turnable horizontally, and having an extension-arm A' at the end, as shown. Upon the end of this bracket is mounted a flat disk C, the shaft of which is journaled in the bracket-arm, as will be hereinafter described, and has a pulley D fixed to it. Around this pulley passes the endless belt $d$, which passes over direction-pulleys D', essentially in line with the bracket-hinge at B, and passing from these pulleys to a motor of any desired description, from which power is transmitted to drive the parts described. The disk is inclosed by a yoke or bracket E, through the transverse part of which its shaft passes, and the sides of the yoke extending outward beyond the periphery of the disk serve to hold the journals of the shaft F, through which power is transmitted to drive the flexible shaft F', which is operatively connected with a tool carried by a dental handpiece. Upon this shaft F is mounted a wheel or roller G, the periphery of which contacts with the surface of the disk C, and the wheel and its shaft are rotated by this contact when the disk is in motion. By sliding the wheel upon a feather on its shaft it may be moved to the center of the disk, where it will not be revolved in either direction. By moving it outward toward the periphery of the disk upon one side it will be rotated in one direction with a speed increasing as it is moved from the center toward the periphery, so that any variation of speed may be accomplished. By moving it toward the opposite side of the disk the rotation of the shaft and the tool or implement will be reversed, which is necessary under certain conditions.

In order to steady the movement and insure a regular rate of motion to the shaft and tool and prevent irregularity, I have shown a sleeve $F^2$, which fits the shaft F extending entirely across between the ends of the yoke E and which has its ends journaled in boxes in the yoke, as shown. The shaft F has a longitudinal key way or slot $f$ made in it, and a lug, screw, or feather H, passing through the side of the sleeve $F^2$, enters the slot $f$ of the shaft, and thus insures the sleeve and shaft rotating in unison. Through the hub of the wheel G passes a screw $g$, which enters a slot made longitudinally in the sleeve $F^2$, so that the rotation of the wheel by its contact with the disk C is transmitted to the sleeve $F^2$ and the shaft F. At the same time, by reason of the slot in the tube and the set-screw $g$ entering it, the wheel G may be moved along the sleeve from one end to the other, traversing the entire diameter of the disk C for the purpose of changing the rate of speed upon either side of the center, or reversing its movement, as previously described.

By fitting the shaft F into the sleeve $F^2$ and journaling the sleeve independently in the yoke E, I provide widely-separated bearings for the sleeve, which causes it to run very steadily and prevents the irregular motion or jumping of the interior shaft F and the flexible shaft and tool which are driven by it.

The yoke E is preferably made of cast metal and has a cap-piece E' fixed across its ends, as shown. This cap-piece and also the opposite side, through which the shaft $c$ passes, are both thickened in the center, so as to stiffen them and prevent vibration. In flanges or lugs projecting outwardly from the sides thereof are journaled the pulleys I I'. Over these pulleys passes the cord J, the ends of which are fixed to an arm K, which extends down and engages an annular groove in the hub of the wheel G. This arm K is also fixed to a sleeve K', which is slidable upon a guide-rod L, fixed across the yoke E outside of and parallel with the shaft F. By pulling upon this cord J from one side or the other it will be seen that the arm K, and with it the wheel G, may be moved to any desired distance across the disk C for the purpose of changing its motion or rate of speed, as before described. The cord J passes around the direction-pulleys I and I'. Thence the two parts are brought together, passing over guide-pulleys I², which are journaled in a yoke M, fixed to the extension-arm A' of the bracket-arm A, so that the pulleys I² are essentially in line with the shaft $c$ of the disk C. From the pulleys I² the cord J leads over small pulleys D², which are mounted upon the same shaft with the direction-pulleys D' of the driving cord or belt $d$. From this point the two parts of the cord J are led over suitable direction-pulleys in a bracket N, which is fixed near the operating-chair, and the ends of the cords J are connected with the opposite ends of a treadle or foot-piece O, which is centrally fulcrumed, as shown. Beneath this foot-piece is fixed a spring P, one end of which is fastened and the other end is slidable on the lower surface of the foot-piece. The angle of the spring fits into a curved socket, as shown at Q, so that when the treadle is brought into a level position it will be retained in that position by this socket. When in this position, the wheel or roller G will stand, essentially, in the center of the disk C and any rotation of this disk will not be communicated to move the wheel G and its shaft in either direction.

By placing the foot upon the treadle O the operator can easily tilt it in either direction, disengaging the latch-spring P, and through the cords J the wheel G will be moved toward the periphery of the disk C either in a direction to drive the shaft forward or to reverse it, the speed at which the shaft is driven being dependent upon the distance of the point of contact of the wheel G from the center of the periphery to the disk which drives it.

The mechanism of the driven disk, wheel G, and the yoke E are all inclosed in a casing R, which surrounds them, and may be made in two parts, the outer part or cap having a screw by which it is secured to the upper portion E' of the yoke, so that it can be readily removed for inspection of the interior.

By leading the cords J to the common center around the direction-pulleys I² in line with the shaft $c$ of the disk C it will be seen that the yoke E, the wheel G, and the flexible driving-shaft can be rotated in a large arc of a circle to suit the convenience of the operator without disarranging the connections of the cord J, and it is thus easy to move the wheel G by means of the treadle, whatever may be the position of the flexible shaft with relation to the bracket-arm about which its journal-supports are turnable.

In order to maintain the disk C in proper contact with the wheel G, I have shown a means for adjusting it, which is constructed as follows: The shaft $c$ passes through a sleeve S, which forms its journal-box. This sleeve is screw-threaded on the periphery and itself screws into an exterior sleeve S' and bears against the under side of the disk C. This sleeve S' is immovably fixed in the bracket-arm A'. The screw-sleeve S has the outer end made polygonal, so that by the use of a wrench it can be turned, and this will advance it, and with it the shaft $c$ and the disk C, so as to maintain the proper contact with the wheel G and compensate for any wear. It is locked at any point by a set-screw $s$. The central portion of the yoke E is perforated and fits over the exterior sleeve S', the bottom or side adjacent to the bracket-arm A resting upon a collar or washer T. Upon the outer end of the sleeve S' is a nut S², which may be screwed down upon the inner side of the bracket E, so as to hold it snugly between the nut and the washer T, at the same time allowing it a sufficient freedom of motion to turn upon its center to accommodate the varying positions of the flexible shaft and driven parts. This nut may be locked by a set-screw or in any other convenient or suitable manner.

The whole device forms a very important improvement in the operation of this class of apparatus.

Having thus described my invention, what I claim as new, and desire to secure by Letters Patent, is—

1. In a dental engine, the combination of a hinged swinging bracket-arm, a vertical shaft journaled in the outer end thereof, a disk carried by said shaft, pulleys and a driving-belt by which the disk is rotated, a casing inclosing the disk, a horizontal shaft within the casing and a wheel adjustable thereon and having its periphery in contact with the face of the disk, a treadle and connections between the same and the wheel whereby the latter may be moved along its shaft to contact with any portion of the face of the disk.

2. In a dental engine, a hinged swinging bracket-arm, a disk, a shaft journaled in the outer end of the bracket-arm and means whereby the disk is rotated, a shaft extending across exterior to the face of the disk at right angles with the disk-shaft, a wheel slidably mounted upon said shaft, having its periphery in contact with the disk, an arm connecting with the hub of the wheel, a guide parallel with the wheel-shaft upon which the arm is slidable, cords connecting with the end of the arm, extending in opposite directions, a yoke carrying the wheel and its shaft and having direction-pulleys for the cords, other direction-pulleys essentially in line with the disk-shaft over which the two parts of the cord pass, and an oscillating treadle, to the opposite ends of which the cord is connected whereby the movement of the treadle serves to move the wheel along its shaft to contact with any portion of the face of the disk.

3. In a dental engine of the character described, a hinged swinging bracket-arm, a shaft carried thereby, a disk on the shaft, a second shaft journaled exterior to the face of the disk and at right angles with its shaft, a longitudinally-slotted sleeve inclosing said second shaft and a yoke in which the ends of said second shaft are journaled, a lug by which the sleeve is removably secured to its shaft, a wheel slidable on the sleeve and a connection whereby the rotation of the wheel is communicated to the sleeve, an arm connecting with the hub of the wheel, a guide for said arm, cords extending from the arm in opposite directions and pulleys by which the two parts of the cord are brought together essentially in line with the disk-shaft, other pulleys over which the two parts of the cord pass, whereby the wheel-shaft may be turned about the axis of the driving-disk shaft without disarranging the position of the cords, and a treadle with the ends of which the cords are ultimately connected so that the driven wheel may be moved upon its shaft by the movement of the treadle.

4. In a dental engine of the character described, a hinged swinging bracket-arm, a disk and a shaft upon which it is carried, a yoke partially inclosing said disk and a second shaft journaled therein outside of the disk and at right angles with the shaft of the latter, a wheel adjustably mounted upon said second shaft with its periphery in contact with the disk, the cords and a connection therefrom to the wheel whereby the latter is moved along its shaft, and a casing by which the mechanism is inclosed.

5. In a dental engine of the character described, a hinged swinging bracket-arm, a shaft carried thereby, a disk on said shaft, a second shaft at right angles with the disk-shaft and a wheel on said second shaft, having its face contacting with the disk, mechanism comprising movable cords and a connection therefrom to the wheel whereby said wheel is movable toward and from the center of the disk, a treadle fulcrumed in the center and adapted to impart motion to said cords, a spring-latch fixed to the treadle and a catch with which the latch engages to hold the treadle centrally, and maintain the wheel in the center of the disk when not in action.

6. In a dental engine of the character described, a hinged swinging bracket-arm, a shaft carried thereby and a disk on said shaft, a flexible tool-operating shaft and means whereby it is driven by the disk in either direction, and the rate of speed varied, a pulley and belt through which power is transmitted to rotate the disk and means for transmitting the motion of the disk to the tool-operating shaft, a sleeve fixed in the end of the bracket-arm, having its interior threaded, a second sleeve, exteriorly threaded and forming a journal-box for the disk-shaft, said second sleeve being turnable to advance it within the other sleeve whereby the position of the disk is regulated.

7. In a dental engine, a hinged swinging bracket-arm, a shaft carried thereby, a disk on said shaft, a sleeve within which the shaft is journaled, a second sleeve inclosing the first-named one and a threaded connection between the two whereby the inner sleeve and its shaft may be advanced, a yoke upon which the power-transmitting mechanism is carried, said yoke fitting the exterior sleeve, a washer with which the yoke contacts upon one side and a nut fitting the sleeve and adapted to adjust the yoke thereon.

In witness whereof I have hereunto set my hand.

ALBERT E. MACDONALD.

Witnesses:
S. H. NOURSE,
JESSIE C. BRODIE.